(12) United States Patent
Abe et al.

(10) Patent No.: US 12,403,672 B2
(45) Date of Patent: Sep. 2, 2025

(54) LAMINATE, ADHESIVE KIT, LAMINATED STRUCTURE AND PRODUCTION METHOD THEREOF, AND CONTACT ADHESIVE COMPOSITION

(71) Applicant: 3M INNOVATIVE PROPERTIES COMPANY, St. Paul, MN (US)

(72) Inventors: Hidetoshi Abe, Yamagata Pref. (JP); Yuji Kashiwazaki, Yamagata Pref. (JP); Mamoru Kanno, Yamagata Pref. (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 841 days.

(21) Appl. No.: 17/691,846

(22) Filed: Mar. 10, 2022

(65) Prior Publication Data

US 2022/0194053 A1 Jun. 23, 2022

Related U.S. Application Data (63) Continuation of application No. 15/780,312, filed as application No. PCT/US2016/064540 on Dec. 2, 2016, now abandoned.

(60) Provisional application No. 62/264,308, filed on Dec. 7, 2015.

(30) Foreign Application Priority Data

Dec. 8, 2015 (JP) .................. 2015-239631

(51) Int. Cl.
| | |
|---|---|
| B32B 7/12 | (2006.01) |
| C09J 7/20 | (2018.01) |
| C09J 7/38 | (2018.01) |
| C09J 9/00 | (2006.01) |
| C09J 11/08 | (2006.01) |
| C09J 111/00 | (2006.01) |
| C09J 111/02 | (2006.01) |
| C09J 133/06 | (2006.01) |
| C09J 157/06 | (2006.01) |

(52) U.S. Cl.
CPC .................. *B32B 7/12* (2013.01); *C09J 7/20* (2018.01); *C09J 7/381* (2018.01); *C09J 9/00* (2013.01); *C09J 11/08* (2013.01); *C09J 111/00* (2013.01); *C09J 111/02* (2013.01); *C09J 133/06* (2013.01); *C09J 157/06* (2013.01); *C08K 2201/005* (2013.01); *C08L 2205/22* (2013.01); *C09J 2301/312* (2020.08); *C09J 2301/408* (2020.08); *C09J 2301/412* (2020.08); *C09J 2411/00* (2013.01); *C09J 2411/003* (2013.01); *C09J 2433/00* (2013.01); *C09J 2433/003* (2013.01); *Y10T 428/254* (2015.01)

(58) Field of Classification Search
None
See application file for complete search history.

(56) References Cited

U.S. PATENT DOCUMENTS

| | | |
|---|---|---|
| 4,049,483 A | 9/1977 | Loder |
| 5,008,139 A | 4/1991 | Ochi |
| 5,196,246 A | 3/1993 | Kauss |
| 5,264,467 A | 11/1993 | DiStefano |
| 5,571,617 A | 11/1996 | Cooprider |
| 5,607,763 A | 3/1997 | Matsuda |
| 5,795,636 A | 8/1998 | Keller |
| 6,015,606 A | 1/2000 | Abe |
| 6,194,064 B1 | 2/2001 | Keely |
| RE37,612 E | 3/2002 | Gleichenhagen |
| 2007/0224395 A1 | 9/2007 | Rowitsch |
| 2008/0118693 A1 | 5/2008 | Bilski |
| 2010/0009182 A1 | 1/2010 | Kato |

FOREIGN PATENT DOCUMENTS

| | | |
|---|---|---|
| DE | 69119620 | 9/1996 |
| EP | 0442380 | 8/1991 |
| EP | 0534393 | 3/1993 |
| GB | 2344061 | 5/2000 |
| JP | 4049450 | 2/1992 |
| JP | H0623354 | 3/1994 |
| JP | 1995-216320 | 8/1995 |
| JP | H08-104776 A | 4/1996 |
| JP | H10-095964 A | 4/1998 |
| JP | 2804743 | 9/1998 |
| JP | H11-035907 A | 2/1999 |
| JP | 2911991 | 6/1999 |
| JP | 3529696 | 5/2004 |
| JP | 5296335 | 9/2013 |
| JP | 2014-133815 A | 7/2014 |
| WO | WO 1997-18276 | 5/1997 |
| WO | WO 2001-26893 | 4/2001 |
| WO | WO 2001-70897 | 9/2001 |

OTHER PUBLICATIONS

International Search report for PCT International Application No. PCT/US2016/064540 mailed on Mar. 27, 2017, 5 pages.

*Primary Examiner* — Cheng Yuan Huang
(74) *Attorney, Agent, or Firm* — Jeffrey M. Olofson (57) ABSTRACT

A laminate comprising a substrate layer; a contact adhesive layer comprising a contact adhesive agent having at least one of chloroprene rubber or acrylic copolymers, as well as microspheres having an average particle size of 0.5 μm or greater in the contact adhesive layer, wherein the contact adhesive layer contains from 5 parts by mass to 500 parts by mass of the microspheres per 100 parts by mass of the contact adhesive agent, and the contact adhesive layer has a plurality of protruding portions because of the the microspheres.

14 Claims, 2 Drawing Sheets

LAMINATE, ADHESIVE KIT, LAMINATED STRUCTURE AND PRODUCTION METHOD THEREOF, AND CONTACT ADHESIVE COMPOSITION

This application is a continuation of U.S. patent application Ser. No. 15/780,312, filed May 31, 2018, now, abandoned.

TECHNICAL FIELD

The present disclosure relates to a laminate having a contact adhesive layer, an adhesive kit, a laminated structure, a production method of such a laminated structure, and a contact adhesive composition.

BACKGROUND ART

Decorative sheets are used for decorating interior or exterior walls, furniture or automobiles. These decorative sheets typically have pressure-sensitive adhesive layer on a back surface and they are applied to the adhered via the pressure sensitive adhesive layers. It is often difficult to apply the decorative sheet on an accurate position because of tackiness of the pressure sensitive adhesive layer. Therefore, it has been developed technology of controlling the tackiness of the pressure sensitive adhesive layer.

U.S. Pat. No. 5,008,139 describes "A pressure-sensitive adhesive layer having, on at least one surface thereof, a layer of evenly dispersed non-adhesive solid particles having an average particle diameter of 10 to 60 microns, wherein at least about half of the solid particles project from the surface of the adhesive layer to a height corresponding to at least about one-fourth of the average particle diameter of the solid particles, and if the solid particles are hollow particles, the walls of the hollow particles are not rupturable by the pressure of bonding. The pressure-sensitive adhesive layer has a very low initial adhesion strength (adhesion strength before press-bonding). After press-bonding, it rapidly develops adhesion strength, and attains a very high final adhesion strength"

U.S. Pat. No. 5,795,636 describes "An adhesive sheet having an adhesive layer and at least one surface being topologically microstructured, either with configured structures or a coating of particles and an underlying adhesive such that the adhesive layer has at least two levels of adhesion, a contact bond and an application bond, such that initial contact bond is substantially less than the application bond and that the contact bond simultaneously changes to the application bond with the application of pressure onto the adhesive sheet."

Contact adhesives are well known for bonding various components or members. JP4049450B describes "an aqueous contact adhesive formed by heat-melting, in the presence of an alkaline substance, a low acid-value tackifier resin that is solid at room temperature and that has a softening point of 100° C. or lower, in a liquid containing a chloroprene rubber latex obtained by copolymerizing an ethylene-based unsaturated carboxylic acid that is copolymerizable with chloroprene and chloroprene in the presence of polyvinyl alcohol, or a chloroprene rubber latex obtained by copolymerizing an ethylene-based unsaturated carboxylic acid that is copolymerizable with chloroprene and chloroprene in the presence of polyvinyl alcohol and glycol ethers".

SUMMARY OF INVENTION

An adhesive-backed laminate construction that provides good repositionability before final setting has been discovered. The adhesive layer is a contact adhesive containing a plurality of beads. The shape and sizing of the beads, and the ratio of beads to contact adhesive, is selected such that the presence of the beads in the adhesive layer effects a plurality of protrusions from the adhesive layer. The protrusions prevent aggressive bonding of between the adhesive layer and an installation substrate, and allow the adhesive-backed laminate construction to slide over an installation surface, effecting good repositionability during the installation process. Once positioning of the adhesive-backed laminate is satisfactory, the position may be finally set by pressing the adhesive-backed laminate against the installation surface.

Decorative adhesive-backed films have typically required the use of a release liner. The release liner protects the adhesive layer during manufacturing and transport, and is removed at the time of installation, revealing the adhesive surface of the adhesive-backed laminate. It is later discarded. Besides being wasteful, the presence a release liner can introduce difficulties into the application process, particularly for large sheets of decorative film, for which the liner removal may be complicated and give rise to wrinkles in the installed laminate.

The present disclosure provides a contact adhesive-backed laminate construction having a low tack adhesive surface that may preclude, in some embodiments, the need for a traditional liner. The low tack adhesive surface may exhibit good slidability and repositionability during application. Upon further pressing of the adhesive securely bonds to the application substrate. Adhesive kit embodiments are also described, which additionally involve the use of a primer adhesive layer applied to the installation substrate before installation of the adhesive-backed laminate.

In one embodiment, is a laminate construction is described, comprising a substrate layer; a contact adhesive layer containing a contact adhesive agent containing at least one of chloroprene rubber or acrylic copolymers, and microspheres having an average particle size of 0.5 μm or greater in the contact adhesive layer, wherein the contact adhesive layer contains from 5 parts by mass to 500 parts by mass of the microspheres per 100 parts by mass of the contact adhesive agent, and wherein the contact adhesive layer has a plurality of protruding microsphere portions.

Another embodiment described herein concerns a film-based article comprising the laminate recited above and a primer agent containing a second contact adhesive agent containing at least one of chloroprene rubber or acrylic copolymers.

Yet another embodiment described herein concerns a method of applying a laminated structure to an installation surface, the method comprising preparing the laminate described above; applying a primer agent containing a second contact adhesive agent containing at least one of chloroprene rubber or acrylic copolymers on a installation surface so as to form a second contact adhesive layer, and placing the laminate on the second contact adhesive layer, and then pressing (and thereby adhering) the contact adhesive layer of the laminate to the second contact adhesive layer.

Yet another embodiment described herein concerns a laminated structure formed on a base material to be adhered comprising the laminate recited above, and a second contact adhesive layer covered on the installation surface, wherein both of the contact adhesive layer of the laminate and the second contact adhesive layer are adhered to each other, the second contact adhesive layer containing a second contact adhesive agent containing at least one of chloroprene rubber or acrylic copolymers.

Yet another embodiment described herein concerns a contact adhesive composition comprising a contact adhesive agent containing at least one of chloroprene rubber or acrylic copolymers, and microspheres having an average particle size of 0.5 μm or greater, and further comprising from 5 parts by mass to 500 parts by mass of the organic resin microspheres per 100 parts by mass of the contact adhesive agent.

Since the laminate of the present invention uses, in some embodiments, a low tack contact adhesive layer surface, a protective liner may not be necessary. When a protective liner is not used, the laminate of the present disclosure can be produced, stored, and transported as a continuous roll of film, or as a stack of a film sheets. This eliminates waste and money associated with the use of liners. Furthermore, in some embodiments the surface of the adhesive layer of the laminate of the present disclosure provides good slidability, positioning, and repositioning After positioning or repositioning the laminate on an installation substrate (such as a wall or other installation surface), the laminate may be adhesively set pressing, with a roller or one's hand, the laminate onto the installation substrate.

The adhesive kit of the present disclosure contains the laminate as described above, and additionally includes a primer agent that is suitable for the contact adhesion of the laminate, thus providing good slidability and better contact adhesion of the laminate upon installation. The primer is applied to the installation surface before the laminate.

The contact adhesive composition of the present disclosure can be suitably used in the production of the laminate described above.

Note that the above description should not be construed to be a disclosure of all of the embodiments and benefits of the present invention.

DESCRIPTION OF EMBODIMENTS

A detailed description for the purpose of illustrating representative embodiments of the present invention is given below. These embodiments should not be construed as limiting the present invention.

The laminate of an embodiment of the present disclosure comprises a substrate layer; a contact adhesive layer comprising a contact adhesive agent containing at least one of chloroprene rubber or acrylic copolymers, and microspheres having an average particle size of 0.5 μm or greater in the contact adhesive layer, wherein the contact adhesive layer contains from 5 parts by mass to 500 parts by mass of the microspheres per 100 parts by mass of the contact adhesive agent. The contact adhesive layer has a plurality of protrusions from its surface, effected by the presence of the microspheres in the adhesive layer.

In this disclosure, "contact adhesive" refers to an adhesive which is typically applied to two surfaces to be adhered together, dried to form film adhesive layers, and brought into contact with pressure so as to form an immediate, durable bond.

In the disclosure "microspheres" refers to particles having diameters than several micrometers. In some preferred embodiments, they are sustainably spherical. Substantially spherical means having a cross-sectional shape corresponding to that of a circle or an ellipse, or having a spherical surface.

Figure 1:
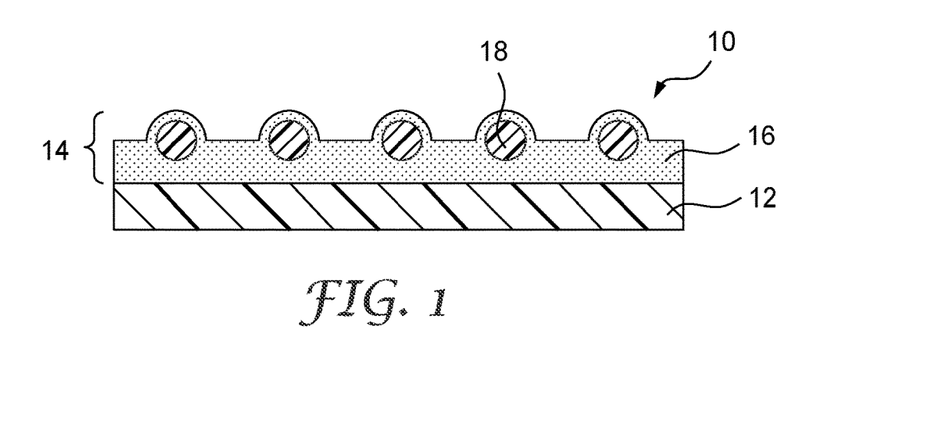
FIG. 1 is a cross sectional view of a laminate of an embodiment of the present invention.

The laminate of an embodiment of the present disclosure is illustrated as a cross sectional view in FIG. 1. The laminate 10 illustrated in FIG. 1 has a substrate layer 12 and a contact adhesive layer 14, and the contact adhesive layer 14 has a contact adhesive agent 16 and organic resin microspheres 18. In FIG. 1, the microspheres 18 are illustrated as being completely covered by the contact adhesive agent 16; however, a part of the microspheres 18 may be exposed to the outside. Furthermore, in FIG. 1, the microspheres 18 are illustrated as separate particles arranged regularly; however, a plurality of the microspheres 18 may be agglomerated, or a single or a plurality of agglomerated microspheres 18 may be arranged irregularly on the surface of the contact adhesive layer. There are a plurality of protruding portions because of the existing of the microspheres on a surface of the laminate 10.

The substrate layer may be selected from various materials and articles depending on the purpose thereof. Examples of the substrate layer include paper, transparent films, decorative films, decorative plates, wallpaper, flooring materials, metal plates, woven fabric, nonwoven fabric, foam, and the like. The substrate layer may be a laminate composed of a plurality of layers. The substrate layer may also be a part of an article having a substrate layer, such as a part of a decorative sheet. For example, each of the substrate layer and the adherend may be a part of one article, such as a flap and a corresponding surface of an envelope. The substrate layer may have undergone surface treatment, such as primer treatment or corona treatment, on a bonding face for the contact adhesive layer.

The contact adhesive layer may have a plurality of protruding portions and a surface that is substantially nontacky at operating temperature (typically room temperature). "Substantially nontacky at room temperature" refers to a condition where an adherend can be removed with no or substantially no resistance that can be felt by hands after the adherend was pressed lightly on the surface of the contact adhesive layer at 23° C.±0.5° C. In this condition, if the contact adhesive is lightly pressed onto an installation surface directly, as would occur during initial positioning of a laminate during an installation, the contact adhesive does not adhere to the installation surface at all, or if there is adhesion it is very light and easily succumbs to an installer's further maneuvering.

A plurality of protruding portions of the contact adhesive layer formed due to the microspheres 18 makes the surface of the contact adhesive layer rough. The degree of the surface roughness of the contact adhesive layer can be evaluated by, for example, a 60 degree gloss value. In some embodiments, the 60 degree gloss value of the contact adhesive layer surface is approximately 1 or greater, approximately 2 or greater, or approximately 3 or greater, but approximately 40 or less, approximately 35 or less, or approximately 30 or less, when measured in accordance with Japanese Industrial Standard Z8741 or ISO 2813.

A part of the contact adhesive layer that interfaces with the installation surface may be covered by another material, such as printing ink or metal thin film, so long as it does not unduly interfere with the performance of the contact adhesive. In one embodiment, the contact adhesive layer also serves as a receiving layer of printing ink, such as ink for inkjet printing. Although in one embodiment the laminate of the present disclosure does not require a liner, a liner may be arranged on the contact adhesive layer surface. In such an embodiment, the contact adhesive layer surface can be protected from oils and fats, dust, or the like when the laminate is used as an intermediate product and is subjected to further processing or treatment.

The contact adhesive agent is a component serving as a base of the contact adhesive layer. The contact adhesive agent adheres to itself or to a chemically similar material by applying pressure without a significant increase in temperature (e.g. without requiring a temperature higher than 50° C.). Therefore, unlike pressure-sensitive adhesive agent, the contact adhesive agent does not adhere to a chemically different material or shows little adhesive force to such a material, typically, at a temperature of approximately 10° C. to approximately 50° C. On the other hand, the pressure-sensitive adhesive agents show tackiness at room temperature (23±0.5° C.) and adhere to different types of materials by applying appropriate pressure (pressure applied by a finger, or the like).

The contact adhesive agent contains at least one of chloroprene rubber or acrylic copolymers as an adhesive component.

The chloroprene rubber (CR) may be a homopolymer or copolymer of chloroprene (2-chloro-1,3-butadiene). Typically, a highly crystalline chloroprene rubber is used due to its excellent contact adhesion. Chloroprene rubber can be obtained by polymerizing chloroprene and, optionally, a copolymerizable monomer by solution polymerization, emulsion polymerization, suspension polymerization, or the like. Examples of the copolymerizable monomer for chloroprene rubber include vinyl-based unsaturated monomers such as styrene, vinyltoluene, 2,3-dichlorobutadiene, acrylic acid, methacrylic acid, methacrylates, acrylates, acrylonitrile, vinyl acetate, and polyvinyl alcohol. Chloroprene rubber may be crosslinked due to the double bond present in chloroprene rubber and a reaction caused by a crosslinking agent.

An acrylic copolymer can be obtained by copolymerizing alkyl acrylates having an alkyl group having from 1 to 8 carbons, alkoxy ethyl acrylates having an alkoxy group having from 1 to 4 carbons, acrylic acid, hydroxy group-containing acrylates, such as 2-hydroxyethyl acrylate, acrylic monomers, such as acrylamide, styrene, vinyltoluene, alkyl methacrylates having an alkyl group having from 1 to 8 carbons, such as methyl methacrylate and ethyl methacrylate, methacrylic acid, hydroxy group-containing methacrylates, such as 2-hydroxyethyl methacrylate, and other vinyl-based unsaturated monomers, such as methacrylamide, maleic acid, and itaconic acid, by solution polymerization, emulsion polymerization, suspension polymerization, or the like. Examples of the alkyl acrylate having an alkyl group having from 1 to 8 carbons include methyl acrylate, ethyl acrylate, n-butyl acrylate, 2-ethylhexyl acrylate, and the like. Examples of alkoxy ethyl acrylate having an alkyl group having from 1 to 4 carbons include 2-methoxyethyl acrylate, 2-ethoxyethyl acrylate, 2-butoxyethyl acrylate, and the like. Among these, use of an acrylic copolymer containing a polymerization unit derived from alkyl acrylate having an alkyl group having from 2 to 4 carbons, such as ethyl acrylate or n-butyl acrylate, as a main component at an amount of, for example, greater than approximately 50% by mass, approximately 70% by mass or greater, or approximately 80% by mass or greater achieves excellent balance of nontackiness and contact adhesion. The acrylic copolymer may be crosslinked.

The glass transition temperature of the acrylic contact adhesive is preferably approximately 0° C. or higher, approximately 10° C. or higher, or approximately 20° C. or higher, but approximately 60° C. or lower, approximately 50° C. or lower, or approximately 40° C. or lower. By setting the glass transition temperature (Tg) of the acrylic contact adhesive to be within the range described above, excellent balance of nontackiness and contact adhesion of the contact adhesive agent can be achieved. If the Tg is low, the tackiness may become stronger and blocking resistance may be lowered. Meanwhile, the Tg is high, adhesiveness of the contact adhesive may be lowered. Unless indicated otherwise, all Tg values referenced herein are measured according to ASTM D4092-07.

The contact adhesive agent may contain additional polymer components. Examples of the additional polymer component include natural rubber, polybutadiene, polyisoprene, ethylene-vinyl acetate copolymers, polyvinyl acetate, polyvinyl acetate copolymers, styrene-butadiene copolymers, styrene-isoprene copolymers, butadiene-acrylonitrile copolymers, polyurethane, polyvinylidene chloride, and the like, and combinations of these. In some embodiments, the additional polymer component is contained in the contact adhesive agent at an amount of approximately 5% by mass or greater, approximately 10% by mass or greater, or approximately 15% by mass or greater, but approximately 60% by mass or less, approximately 50% by mass or less, or approximately 40% by mass or less, in terms of solid content of the contact adhesive agent.

The contact adhesive agent may contain a tackifier. As the tackifier, rosin derivatives, such as polymerized rosin and hydrogenated rosin, terpene-modified products, such as terpene resins and terpene phenol resins, coumarone-indene resins, aliphatic hydrocarbon resins, aromatic petroleum resins, phenol-based resins, styrene-based resins, xylene resins, and the like can be used. In some embodiments, the tackifier is contained in the contact adhesive agent at an amount of approximately 1% by mass or greater, approximately 2% by mass or greater, or approximately 5% by mass or greater, but approximately 50% by mass or less, approximately 30% by mass or less, or approximately 20% by mass or less, in terms of solid content of the contact adhesive agent.

The contact adhesive agent may further contain, as an optional component, an emulsifier, surfactant, and/or pH adjusting agent that are(is) used for emulsion polymerization or suspension polymerization of the adhesive component, a plasticizer, an antioxidant, a viscosity adjusting agent, a surfactant, a humectant, a UV absorbing agent, a photostabilizer, a pigment, a biocide, a preservative, a corrosion inhibitor, an inorganic filler, or the like. The contact adhesive can be cross-linked.

The microspheres have an average particle size of approximately 0.5 μm or greater. The average particle size of the microspheres is defined as a volume average particle size (Dv) that can be measured by a laser diffraction scattering type particle size distribution analyzer.

By allowing the microspheres having an average particle size of approximately 0.5 μm or greater, a plurality of adhesive protrusions extend outward from the adhesive layer surface, thereby raising the adhesive layer surface somewhat, keeping it from making intimate contact with an installation surface (except in the presence of intentional pressure), and thereby making the surface substantially nontacky. The plurality of the microspheres may be agglomerated in the contact adhesive layer. Such an agglomerate of the microspheres advantageously can contribute to formation of the protruding portions of the contact adhesive layer surface.

In some embodiments, the average particle size of the microspheres is approximately 0.3 nm or greater, approximately 0.5 nm or greater, or approximately 0.7 nm or greater, but approximately 100 nm or less, approximately 70 nm or less, or approximately 50 nm or less. If the average particle size is less than 0.3 nm, it may be difficult to form the protruding portions based on the existing of the microspheres on the contact adhesive layer surface. If the average particle size is greater than 100 nm, the protruding portions be unsuitably rough and thus be noticeable on final application.

In some embodiments, the microspheres are preferably an organic resin. As the organic resin particles are relatively light compared to inorganic particles, the organic resin microspheres tend not to settle and can keep good dispersibility, when they are mixed with the contact adhesive. Eventually, the microspheres can be dispersed more uniformly in the contact adhesive layer.

In some embodiments, specific gravity of the microspheres for the contact adhesive is approximately 0.9 or greater, approximately 1.0 or greater, or approximately 1.05 or greater, but approximately 1.50 or less, approximately 1.40 or less, or approximately 1.35 or less. By selecting the density of the microspheres to be within the range described above, slidability characteristics can be more uniformly imparted to the entire surface of the contact adhesive layer, by preventing extremely uneven distribution (e.g., precipitation) of the microspheres in the contact adhesive layer during the formation of the contact adhesive layer.

In some embodiments, the microspheres are nontacky. The nontackiness refers to a condition where microspheres have flowability at the operation temperature, typically at room temperature (23° C.±0.5° C.). If nontacky microspheres are used, microspheres can obtain the flowability among microspheres, slidability features can be more uniformly imparted to the entire surface of the contact adhesive layer by preventing extremely uneven distribution (e.g., precipitation) of the microspheres in the contact adhesive layer during the formation of the contact adhesive layer.

The microspheres may contain a polymer, such as an acrylic polymer (e.g. homopolymers and copolymers of alkyl acrylates such as polymethyl methacrylate and n-butyl acrylate, or the like), polycarbonate, polyurethane, polyester, and polystyrene. These polymers may be crosslinked. The microspheres are preferably acrylic polymers, which show suitable dispersibility in the contact adhesive agent. Since the microspheres of crosslinked acrylic polymer are unlikely to be deformed due to its high hardness, the microspheres can impart even higher slidability to the contact adhesive layer. Further, it is preferably used crosslinked polymer for micorshere as to obtain solvent resistance and stable high elasticity for large temperature range.

The microspheres may be solid microspheres or hollow microspheres. As hollow microspheres, shell and core type particle can be used. For example, microspheres having the shell part made of urethane resin and the core part made of acrylic resin can be used. The microspheres can be colored by pigments or dye. Microspheres are preferably solid ones. Solid microspheres, typically more unlikely to be deformed under load, may impart even higher slidability characteristics to the contact adhesive layer. The microspheres are preferably acrylic polymers, particularly preferably solid microspheres of crosslinked acrylic polymer, due to the high hardness and a good load bearing when being rolled up.

The shape of the microspheres is, in one embodiment, substantially spherical or spherical. By using substantially spherical or spherical microspheres, as compared with non-spherical shapes, slidability of the contact adhesive layer can be further enhanced.

The microspheres preferably have high elasticity and are hard to deform. In some embodiments, the elastic modulus of the microspheres is approximately $2 \times 10^6$ Pa or greater, approximately $5 \times 10^6$ Pa or greater, or approximately $1 \times 10^7$ Pa or greater; but approximately $5 \times 10^{11}$ Pa or less, approximately $1 \times 10^{11}$ Pa or less, or approximately $5 \times 10^{10}$ Pa or less.

The microspheres are contained in the contact adhesive layer at ratio of approximately 5 parts by mass to approximately 500 parts by mass per 100 parts by mass of the contact adhesive agent. In some embodiments, the microspheres are contained in the contact adhesive layer at a ratio of approximately 2 parts by mass or greater, approximately 5 parts by mass or greater, or approximately 8 parts by mass or greater; but approximately 550 parts by mass or less, approximately 500 parts by mass or less, or approximately 450 parts by mass or less, per 100 parts by mass of the contact adhesive agent. By setting the compounded amount of the microspheres to be within the range described above, a plurality of protruding portions are formed on the contact adhesive layer surface. When positioned by an installer against an installation substrate, a laminate having a contact adhesive with a plurality of protruding portions (formed as described above) makes the surface of the contact adhesive layer substantially nontacky at room temperature, and provides good slidability during application of the laminate. In some embodiments, the laminate does not require a a protective liner.

A contact adhesive layer can be formed by using a contact adhesive composition comprising a contact adhesive agent containing at least one of chloroprene rubber or acrylic copolymers, and nontacky microspheres having an average particle size of approximately 0.5 µm or greater, and containing from approximately 5 parts by mass to approximately 500 parts by mass of the microspheres per 100 parts by mass of the contact adhesive agent. The components and the amounts contained in the contact adhesive composition are as described above for the contact adhesive layer.

The contact adhesive composition can be prepared by mixing the microspheres into a solvent system, emulsion system, or solventless system composition containing at least one of chloroprene rubber or acrylic copolymers as an adhesive component, and other optional components, such as an additional polymer component, a tackifier, a plasticizer, and the like. Examples of the solvent system composition include organic solvents such as methanol, ethanol, hexane, toluene, acetone, methyl ethyl ketone, and ethyl acetate, and combinations of these.

From the perspectives of requiring no organic solvent treatment during the production step of the laminate and achieving excellent coatability, it is advantageous for the contact adhesive composition to be an aqueous emulsion.

When the contact adhesive composition is a solvent system or an emulsion system, the solid content thereof can be set to, for example, approximately 20% by mass or greater, approximately 30% by mass or greater, or approximately 40% by mass or greater; but approximately 80% by mass or less, approximately 70% by mass or less, or approximately 60% by mass or less. By setting the solid content to be within the range described above, a composition having good coatability and drying property can be obtained.

The laminate of the present disclosure can be produced by applying the contact adhesive composition on a surface of a substrate layer and, as necessary, drying or curing it to form a contact adhesive layer on the substrate layer. The application of the contact adhesive composition onto the substrate layer surface can be performed using, for example, knife coating, bar coating, blade coating, doctor coating, roll coating, cast coating, spraying, screen printing, stencil printing, brush coating, or the like. The application conditions of the contact adhesive composition, such as coating speed, application temperature, coating thickness (wet thickness), and drying or curing conditions including for example drying or curing temperature, can be selected in a manner that the protruding portions are formed with sufficient density on the contact adhesive layer surface.

The contact adhesive composition is preferably applied on the substrate layer surface in a manner that the mass per unit area of the contact adhesive layer is approximately 5 $g/m^2$ or greater, approximately 10 $g/m^2$ or greater, or approximately 15 $g/m^2$ or greater; but approximately 100 $g/m^2$ or less, approximately 80 $g/m^2$ or less, or approximately 60 $g/m^2$ or less. By setting the mass per unit area of the contact adhesive layer to be within the range described above, the protruding portions can be formed on the entire surface of the contact adhesive layer with sufficient density and in-plane uniformity of the slidability can be enhanced.

The thickness of the contact adhesive layer can be set typically to approximately 5 μm or greater, approximately 10 μm or greater, or approximately 15 μm or greater; but approximately 100 μm or less, approximately 80 μm or less, or approximately 60 μm or less. By setting the thickness of the contact adhesive layer to be within the range described above, the protruding portions can be formed on the contact adhesive layer surface in a manner such that the microspheres are not completely embedded in the contact adhesive layer and protrude somewhat from, or sit proud of, the contact adhesive layer.

In another embodiment of the present disclosure, a kit which is a combination of the laminate described above and a primer agent is provided. The kit could be sold to a customer. The primer agent is used to form a second contact adhesive layer on the installation surface and contains a second contact adhesive agent containing at least one of chloroprene rubber or acrylic copolymers, and optionally, nontacky second microspheres having an average particle size of approximately 0.5 μm or greater. In the primer layer, the microspheres are an optional component, and the components and the amounts of the microspheres contained in the primer agent are the same as those described for the contact adhesive composition.

The second contact adhesive agent and/or the second microspheres, which are an optional component, contained in the primer agent may be the same as or different from the contact adhesive agent (first contact adhesive agent) and/or the microspheres (first microspheres) contained in the contact adhesive layer (first contact adhesive layer) of the laminate. By using substances having chemical properties that are similar to those of the adhesive component contained in the first contact adhesive agent and the adhesive component contained in the second contact adhesive agent, i.e. both of the adhesive components in the first and second contact adhesive agents being chloroprene rubber or the both of the adhesive components being acrylic copolymers, even higher contact adhesion can be achieved.

In some embodiments, the primer agent contains the second microspheres at an amount of approximately 2 parts by mass or greater, approximately 5 parts by mass or greater, or approximately 8 parts by mass or greater; but approximately 550 parts by mass or less, approximately 500 parts by mass or less, or approximately 450 parts by mass or less, per 100 parts by mass of the second contact adhesive agent. In these embodiments, the plurality of protruding portions formed on the surface of the second contact adhesive layer of the installation surface via application of the primer agent reduces the initial contact area of a laminate brought into contact with the prime installation surface, and thus the laminate can be more easily slid and positioned on the adherend surface. Furthermore, while not wishing to be bound to any particular theory, in these embodiments, it is conceived that shear adhesion can be enhanced by making the microspheres contained in the contact adhesive layer of the laminate and the microspheres in the second contact adhesive layer formed on the surface of the installation surface to engage each other when the laminate is adhered to the installation surface via further pressing (as by an installer's hand or via rollers or the like). When the substrate layer of the laminate is flexible like a decorative film, dimensional stability of the laminate may be enhanced by suppressing the in-plane shrinkage of the substrate layer due to the engaging of the microspheres.

Friction, and thus slideability, between the contact adhesive layer of the laminate and the the primer agent is a function of the total amount of the microspheres contained in the adhesive layer and primer agent layers, respectively. In some embodiments, the total of the amount (part by mass) of the microspheres (first microspheres) per 100 parts by mass of the contact adhesive agent (first contact adhesive agent) contained in the contact adhesive layer of the laminate and the amount (part by mass) of the second microspheres per 100 parts by mass of the second contact adhesive agent of the primer agent is approximately 5 parts by mass or greater, approximately 7 parts by mass or greater, or approximately 9 parts by mass or greater; but approximately 1100 parts by mass or less, approximately 1000 parts by mass or less, or approximately 900 parts by mass or less.

Figure 2:
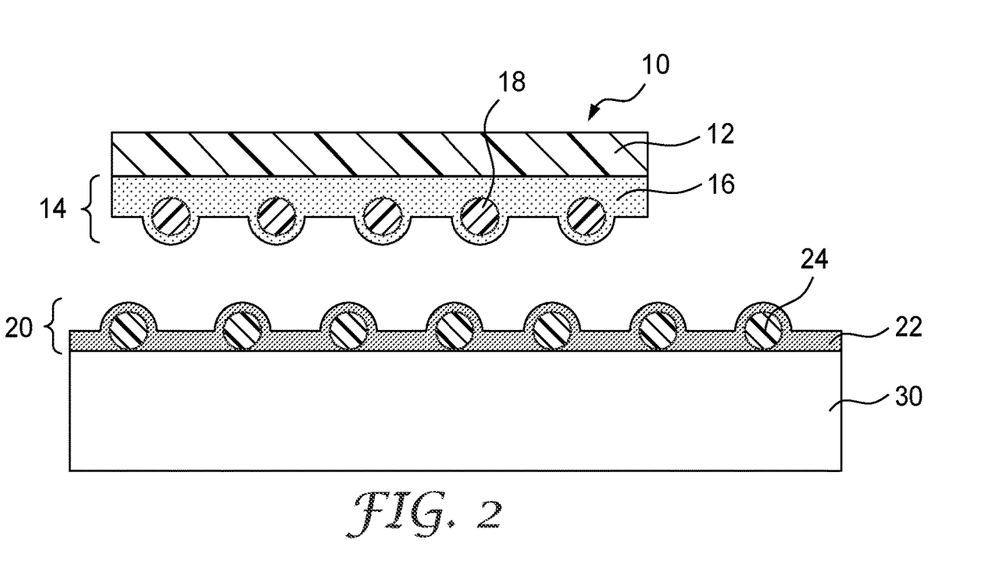
FIG. 2 is a drawing for explaining the method of producing a laminated structure of an embodiment of the present disclosure.
Figure 3:
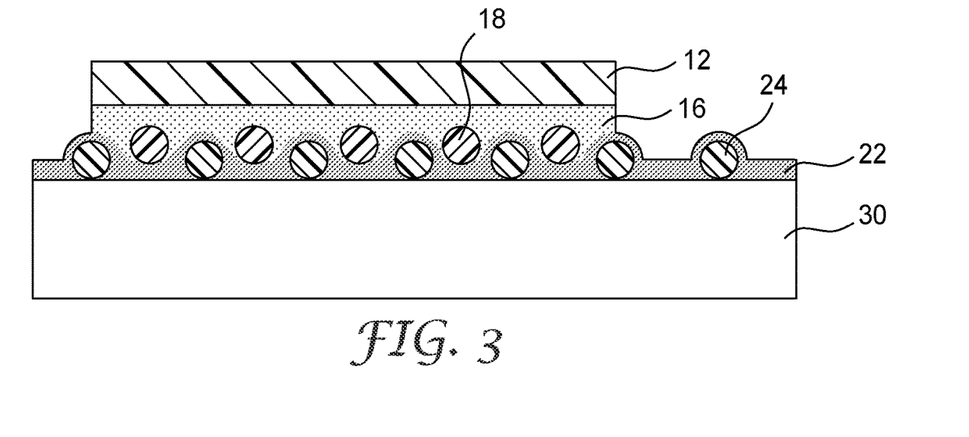
FIG. 3 is a cross sectional view of a laminated structure.

In yet another embodiment of the present disclosure, as shown in FIG. 2, a method of producing a laminated structure is shown. The method comprises the steps of preparing laminate 10; applying the primer agent on a surface of an installation surface 30 so as to form a second contact adhesive layer 20; and placing the laminate 10 on the second contact adhesive layer 20. Using such method, the laminate 10 can slide because of the plurality of protruding portions 18 on the contact adhesive layer 14, accordingly, the laminate 10 can be repositioned to an accurate position. As shown in FIG. 2, if the second contact adhesive layer 20 contains microspheres 24, the laminate 10 can exhibit better slidability. When positioned properly by the installer, the contact adhesive layer 14 of the laminate 10 may be brought into more intimate contact with the second contact adhesive layer 20 by the installer applying pressure to successive portions of the laminate 10 onto the installation surface 30 so as to form a laminate structure shown in FIG. 3. Such pressure may be applied using techniques well known in the art, such as by pressing with a hand, roller, or the like.

Figure 4A:
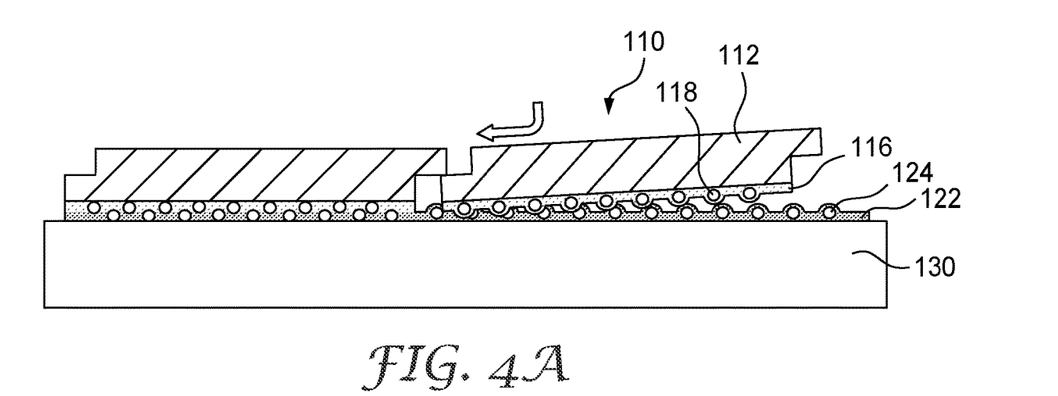
FIGS. 4A and 4B are for explaining the method of installing flooring panels using a laminated structure of an embodiment of the present disclosure.
Figure 4B:
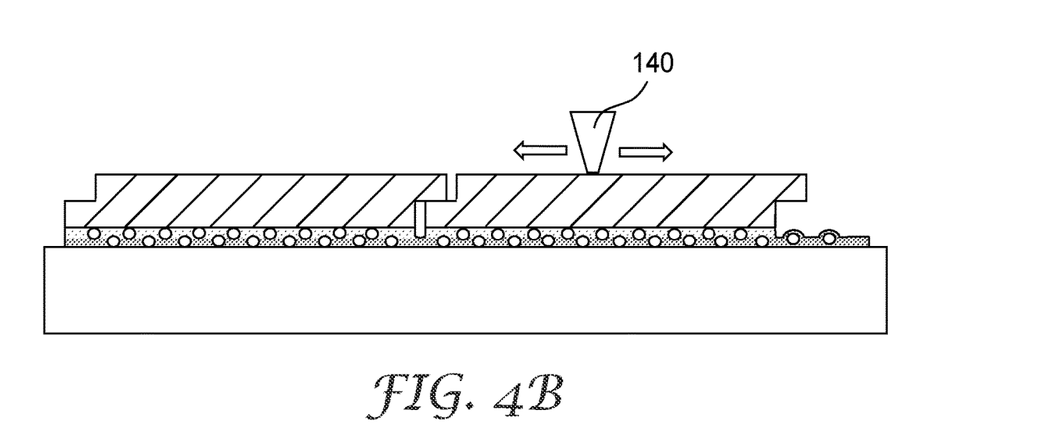

FIG. 4A and FIG. 4B show a method of installing floor materials such as flooring panels using an adhesive kit of the present disclosure. Flooring panels typically have a protrusion on a side surface, and at installation they are positioned to mate with the a recess on the side surface of an adjacent material. Flooring panels are often bonded to a carrier material such as particle board, mortar, or the like, which is arranged on a floor of a building, in a manner that the flooring panels mates with an adjacent flooring panels. A contact adhesive comprising a contact adhesive layer 116 having a plurality of protruding portion because of microspheres 118 can be formed on the substrate layer 116 of a flooring panel, and, meanwhile, a primer agent containing microspheres 124 can be applied on a surface of a floor 130 to form a second contact adhesive layer 122 on the floor 130 using an adhesive kit in this disclosure. The contact adhesive layer 116 of the flooring panel 110 can slide smoothly, allowing for easy repositioning. Once the panels are in proper position, their position may be fixed by pressing with a pressure tool 140.

The installation surface may be, for example, a surface of a piece of furniture, such as bookshelf, cupboard, or chest, an inner wall or floor of a building, an inner wall or outer wall of an automobile or a railway vehicle, a surface of a household item.

The application of the primer agent onto the installation surface can be performed in the same manner as for the application of the contact adhesive composition onto the substrate layer surface, as mentioned above. Examples include the use of knife coating, bar coating, blade coating, doctor coating, roll coating, cast coating, spraying, screen printing, stencil printing, brush coating, or the like. After the primer agent is applied to the installation surface, drying or curing may be performed as necessary. In embodiments where the primer agent contains the second organic resin microspheres, the application conditions of the primer agent, such as coating speed, application temperature, coating thickness (wet thickness), and drying or curing conditions including, for example, drying or curing temperature, can be selected in a manner that the protruding portions are formed with sufficient density on the second contact adhesive layer surface.

When the laminate is placed on the installation surface in a manner that the surface of the contact adhesive layer of the laminate faces the surface of the second contact adhesive layer and laminated by pressing, the pressure applied to the laminate can be set to, for example, approximately 1 k Pa or greater, approximately 5 kPa or greater, or approximately 10 k Pa or greater; but approximately 1000 k Pa or less, approximately 600 k Pa or less, or approximately 200 k Pa or less. Positioning or repositioning of the laminate can be performed by sliding the laminate on the installation surface. The lamination is typically performed at approximately 10° C. or higher, or approximately 20° C. or higher; but approximately 100° C. or lower, or approximately 50° C. or lower or approximately 1 second or longer, or approximately 3 seconds or longer; but approximately 60 mins or shorter, or approximately 30 mins or shorter. As described above, an installed structure having the substrate layer, the first contact adhesive layer (contact adhesive layer of the laminate), the second contact adhesive layer (applied to the installation surface), and then the installation surface, in this order, can be formed. When the first contact adhesive layer and the second contact adhesive layer have identical chemical composition, the interface between these adhesive layers, after the two layers are pressed together, may not be easily observed.

The laminate, the adhesive kit, and the contact adhesive composition of the present disclosure can be widely used for industrial purposes such as for interior and exterior of automobiles, railway vehicles, and the like, general household utensils, such as envelopes, as well as for housing and building purposes, including applications of a decorative sheet or decorative plate to furniture, such as bookshelf, cupboard, or chest, or to an inner wall of a building, installing interior building materials, such as flooring materials, on a floor of a building, or the like. Furthermore, use of protective liners processing paper, processing film, or the like during the production of a decorative sheet can be omitted, in some embodiments, by using the laminate of the present disclosure.

EXAMPLES

In the following working examples, specific embodiments of the present disclosure are exemplified, but the present invention is not restricted thereto. All parts and percentages are by mass unless otherwise indicated.

Materials used in the present working examples are shown in Table 1.

TABLE 1

| | Product name or composition | Tg (° C.) | Molecular Weight | Solvent | Solid content (mass %) |
|---|---|---|---|---|---|
| Adhesive agent 1 (A1) | WG 22, chloroprene rubber-based contact adhesive agent (Konishi Co., Ltd., Osaka-shi, Osaka, Japan) | −28[1] | — | Water | 55 |
| Adhesive agent 2 (A2) | Bond 7, acrylic contact adhesive agent (3M Japan Limited, Shinagawa-ku, Tokyo, Japan) | 22[1] | — | Water | 53 |
| Adhesive agent 3 (A3) | n-Butyl acrylate (BA) - acrylic acid (AA) = 94:6, adhesive acrylic polymer | −48[2] | 560,000 | Ethyl acetate | 33 |
| Adhesive agent 4 (A4) | JA7562, acrylic pressure-sensitive adhesive (3M Japan Limited, Shinagawa-ku, Tokyo, Japan) | — | — | Water | 65 |
| Acrylic microspheres 1 (B1) | Chemisnow (trademark) MZ-20HN, nontacky solid microspheres, volume average particle size Dv 20 μm, crosslinked acrylic polymer (Soken Chemical & Engineering Co., Ltd., Toshima-ku, Tokyo, Japan) | — | — | — | 100 |

TABLE 1-continued

| | Product name or composition | Tg (° C.) | Molecular Weight | Solvent | Solid content (mass %) |
|---|---|---|---|---|---|
| Acrylic microspheres 2 (B2) | Chemisnow (trademark) MX-80H3wT, nontacky solid microspheres, volume average particle size Dv 0.8 µm, crosslinked acrylic polymer (Soken Chemical & Engineering Co., Ltd., Toshima-ku, Tokyo, Japan) | — | — | — | 100 |
| Acrylic microspheres 3 (B3) | Chemisnow (trademark) MX-500H, nontacky solid microspheres, volume average particle size Dv 5 µm, crosslinked acrylic polymer (Soken Chemical & Engineering Co., Ltd., Toshima-ku, Tokyo, Japan) | — | — | — | 100 |
| Acrylic microspheres 4 (B4) | Chemisnow (trademark) MZ-10HN, nontacky solid microspheres, volume average particle size Dv 10 µm, crosslinked acrylic polymer (Soken Chemical & Engineering Co., Ltd., Toshima-ku, Tokyo, Japan) | — | — | — | 100 |
| Acrylic microspheres 5 (B5) | Chemisnow (trademark) MZ-30H, nontacky solid microspheres, volume average particle size Dv 30 µm, crosslinked acrylic polymer (Soken Chemical & Engineering Co., Ltd., Toshima-ku, Tokyo, Japan) | — | — | — | 100 |
| Urethane microspheres 6 (B6) | Art-pearl (trademark) C-400, nontacky solid elastic microspheres, volume average particle size Dv 14 µm, crosslinked urethane polymer (Negami Chemical Industrial Co., Ltd., Nomi, Ishikawa, Japan) | −13[3] | — | — | 100 |
| Urethane microspheres 7 (B7) | Art-pearl (trademark) P400T, nontacky solid elastic microspheres, volume average particle size Dv 16 µm, crosslinked urethane polymer (Negami Chemical Industrial Co., Ltd., Nomi, Ishikawa, Japan) | −34[3] | — | — | 100 |
| Urethane microspheres 8 (B8) | Art-pearl (trademark) JB400T, nontacky solid elastic microspheres, volume average particle size Dv 17 µm, crosslinked urethane polymer (Negami Chemical Industrial Co., Ltd., Nomi, Ishikawa, Japan) | −52[3] | — | — | 100 |
| Acrylic microspheres 9 (B9) | Art-pearl (trademark) GR200, nontacky solid elastic microspheres, volume average particle size Dv 32 µm, crosslinked acrylic polymer (Negami Chemical Industrial Co., Ltd., Nomi, Ishikawa, Japan) | — | — | — | 100 |
| Acrylic microspheres 10 (B10) | Tacky solid microspheres, volume average particle size Dv 29 µm, crosslinked acrylic polymer (3M Japan Ltd. Shinagawa,Tokyo, Japan) | −49[2] | — | Water | 100 |
| Primer 1 (P1) | A mixed solution of A1 and B1, A1:B1 = 100:10 (solid content ratio) | — | — | Water | — |
| Primer 2 (P2) | A mixed solution of A2 and B1, A2:B1 = 100:10 (solid content ratio) | — | — | Water | — |
| Primer 3 (P3) | DI-NOC (registered trademark) primer DP900N3 (3M Japan Limited, Shinagawa-ku, Tokyo, Japan) | — | — | Ethyl acetate | — |
| Primer 4 (P4) | A mixed solution of A2 and B1, A2:B1 = 100:30 (solid content ratio) | — | — | Water | — |

TABLE 1-continued

| | Product name or composition | Tg (° C.) | Molecular Weight | Solvent | Solid content (mass %) |
|---|---|---|---|---|---|
| Primer 5 (P5) | A mixed solution of A1 and B10, A1:B10 = 100:30 (solid content ratio) | — | — | Water | — |
| Crosslinking agent (CL1) | Epoxy-based crosslinking agent E-AX (Soken Chemical & Engineering Co., Ltd., Toshima-ku, Tokyo, Japan) | — | — | Toluene | 5 |

[1]Calculated from tanδ of dynamic viscoelasticity measurement
[2]Calculated by Fox equation
[3]Value provided by manufacturer's catalog The glass transition temperatures (Tg) of the adhesive agent 1 (A1) and the adhesive agent 2 (A2) were measured using an ARES dynamic viscoelasticity measuring device (manufactured by TA Instruments Japan Inc., Shinagawa-ku, Tokyo, Japan). A1 or A2 was formed into a film having a dry thickness of 3 mm, and test samples having a diameter of about 7.9 mm were produced by punching out the film. A peak temperature of loss factor tan δ (=shear loss elastic modulus G"/shear storage elastic modulus G') obtained by measuring the shear storage elastic modulus G' and the shear loss elastic modulus G" in shear mode at a frequency of 1.0 Hz, while the temperature was raised at a rate of temperature increase of 5.0° C./min from −20° C. to 150° C., was used as the glass transition temperature.

The adhesive agent 3 (A3) was prepared by the following procedure. A3 was prepared as an ethyl acetate solution (solid content: 33%) by dissolving 94 parts by mass of n-butyl acrylate (BA) and 6 parts by mass of acrylic acid (AA) in 200 parts by mass of ethyl acetate, adding 0.2 parts by mass of 2,2'-azobis(2,4-dimethylvaleronitrile) (trade name: V-65, manufactured by Wako Pure Chemical Industries, Ltd., Osaka-shi, Osaka, Japan) as a polymerization initiator, and then reacting the mixture for 24 hours at 65° C. in a nitrogen atmosphere. The weight average molecular weight (Mw) of A3 was 560,000, and the glass transition temperature (Tg) was −48° C. The Tg was determined by the Fox equation (below equation) assuming that each polymer is formed by copolymerization of n types of monomers.

$$1/Tg = X_1/(Tg_1 + 273.15) + X_2/(Tg_2 + 273.15) + \ldots + X_n/(Tg_n + 273.15)$$
Equation 2

($Tg_1$: Glass transition temperature of homopolymer of component 1, $Tg_2$: Glass transition temperature of homopolymer of component 2, $Tg_n$: Glass transition temperature of homopolymer of component n, $X_1$: Mass fraction of component 1 monomer that is added during polymerization, $X_2$: Mass fraction of component 2 monomer that is added during polymerization, $X_n$: Mass fraction of component n monomer that is added during polymerization, $X_1 + X_2 + \ldots X_n = 1$)

Evaluation Method

1. Blocking Resistance A

The test piece was cut into a length of 300 mm and a width of 210 mm. The test piece had no release liner. The test piece was wound around a 6-inch core and left at 23° C. for 48 hours. When the test piece did not adhere to the embossed surface of the film and was easily peeled off, the test piece was evaluated as being "excellent". When the test piece was slightly adhered to the embossed surface of the film but was peeled off, the test piece was evaluated as being "good". When the test piece was firmly adhered to the embossed surface of the film but was peeled off without extending the film, the test piece was evaluated as being "fair". When the test piece was firmly adhered to the embossed surface of the film and separation of these was difficult, the test piece was evaluated as being "poor".

2. Blocking Resistance B

Two test pieces were prepared. The adhesive layer face of the first test piece was lightly placed on the top of the face on which no adhesive agent was coated of the second test piece, at 23° C. When the first test piece did not adhere to the surface of the second test piece and was easily peeled off, the case was evaluated as being "excellent". When the first test piece was slightly adhered to the surface of the second test piece but was peeled off, the case was evaluated as being "good". When the first test piece was firmly adhered to the surface of the second test piece and separation of these was difficult, the case was evaluated as being "poor".

3. Slidability A

The test piece was cut into a length of 150 mm and a width of 25 mm. The adhesive layer face of the test piece was lightly brought into contact with the primer-treated face of plasterboard at 25° C. When the test piece did not adhere to the plasterboard surface and was easily slid, the test piece was evaluated as being "excellent". When the test piece was capable of sliding on the plasterboard surface, the test piece was evaluated as being "good". When the test piece was firmly adhered to the plasterboard surface and thus sliding was difficult, the test piece was evaluated as being "poor".

4. Slidability B

Two test pieces were prepared. The adhesive layer face of the first test piece was placed on the top of the adhesive layer face of the second test piece without applying pressure at 23° C. When the first test piece was easily slid on the surface of the second test piece, the case was evaluated as "good". When the first test piece was firmly adhered to the surface of the second test piece and thus sliding was difficult, the case was evaluated as "poor".

5. Adhesive Force

The test piece was cut into a length of 150 mm and a width of 25 mm. The adhesive layer face of the test piece was pressure-adhered to the primer-treated face of plasterboard at 23° C. using a squeegee, and then left at 23° C. for 48 hours. The adhesive force was measured in accordance with JIS Z 0237 8.2.3. Using a tensile testing machine (Tensilon universal testing machine, model: RTC-1210A, manufactured by A & D Company, Limited, Toshima-ku, Tokyo, Japan), 180° peel strength was measured at a peeling rate of 300 mm/min at 20° C. For all the test pieces, peeling mode was for surface breakage of the plasterboard, and the peak value of the adhesive force was recorded as the representative value.

6. Adhesive Property

Two test pieces were prepared. The adhesive layer face of the first test piece was placed on the top of the adhesive layer face of the second test piece and pressure-adhered using a squeegee in an environment at 23° C. The test pieces were left for 5 minutes in an environment at 23° C. When the test pieces were firmly adhered, the case was evaluated as being "good". When the test pieces were easily peeled, the case was evaluated as being "poor".

7. 60 Degree Gloss Value

The 60 Degree gloss values of contact adhesive layer were measured by portable gloss meter GMX-202 (Manufactured by Murakami Color Research Laboratory (Chuo-ku, Tokyo, Japan). The values were measured at three positions. Averaged value was calculated.

Example 1

A contact adhesive composition was prepared by mixing the adhesive agent 1 (A1) and the acrylic microspheres 1 (B1). The mass ratio of A1 and B1 was 100:10 in terms of solid content. The contact adhesive composition was coated on a smooth surface of an embossed polyvinyl chloride (PVC) film having a thickness of about 170 μm using a knife coater and dried for 4 minutes at 40° C. After the drying, a contact adhesive layer having a thickness of 16 μm was obtained. The contact adhesive layer had recesses and protrusions on the surface. The coated amount of the contact adhesive layer was 23 g/m². The surface of the contact adhesive layer was substantially nontackey and it is unnecessary to cover the surface by a release liner. As the primer layer (second contact adhesive layer), the primer 1 (P1) was coated on a plasterboard using a brush. The primer layer was dried for 1 hour at 23° C. After the drying, the coated amount of the primer layer was 35 g/m². The PVC film having the contact adhesive layer was pressure-adhered to the primer layer of the plasterboard using a squeegee at 23° C. The evaluation results are also shown is Table 2.

Examples 2 to 51

The test piece of Example 2 to 51 were produced in the same manner as in Example 1. However, each formulation of adhesive and microspheres for the adhesive layer and primer condition, and manufacturing conditions are shown is Table 2. The evaluation results are also shown is Table 2.

Comparative Example 1

A pressure-sensitive adhesive composition was prepared by mixing the adhesive agent 3 (A3) and the crosslinking agent 1 (CL1). The mass ratio of A3 and CL1 was 100:0.1 in terms of solid content. The pressure-sensitive adhesive composition was coated on a smooth surface of an embossed polyvinyl chloride (PVC) film having a thickness of 170 μm using a knife coater and dried for 5 minutes at 95° C. After the drying, a pressure-sensitive adhesive layer having a thickness of 38 μm was obtained. The coated amount of the pressure-sensitive adhesive layer was 46 g/m². As the pressure-sensitive adhesive layer has high tackiness at room temperature, it was necessary to cover the surface of the adhesive layer by a release liner. Furthermore, as the primer layer, the primer 3 (P3) was coated on a plasterboard using a brush. The primer layer was dried for 1 hour at 23° C. The PVC film having the pressure-sensitive adhesive layer was pressure-adhered to the primer layer of the plasterboard using a squeegee at 23° C. The evaluation results are shown is Table 3.

Comparative Examples 2 to 14

The test piece of Comparative Examples 2 to 14 were produced in the same manner as in Example 1. However, each formulation of adhesive and microspheres for the adhesive layer and primer condition, and manufacturing conditions are shown is Table 3. The evaluation results are also shown is Table 3.

| | Adhesive agent | | Microspheres | | Adhesive layer | | | | | | | Adhesive force (N/25 mm) |
|---|---|---|---|---|---|---|---|---|---|---|---|---|
| | Type | Part by mass | Type | Part by mass | Thickness (μm) | Coated amount (g/m²) | Release liner | 60 Degree gloss | Primer | Blocking resistance A | Slidability A | |
| Example 1 | A1 | 100 | B1 | 10 | 16 | 23 | None *) | 22 | P1 | Excellent | Good | 30 |
| Example 2 | A1 | 100 | B1 | 10 | 20 | 30 | None | 20 | P1 | Excellent | Good | 30 |
| Example 3 | A1 | 100 | B1 | 30 | 19 | 27 | None | 11 | P1 | Excellent | Excellent | 33 |
| Example 4 | A1 | 100 | B1 | 30 | 23 | 33 | None | 9 | P1 | Excellent | Excellent | 31 |
| Example 5 | A1 | 100 | B1 | 10 | 16 | 23 | None | 22 | A1 | Excellent | Good | 33 |
| Example 6 | A1 | 100 | B1 | 10 | 20 | 30 | None | 20 | A1 | Excellent | Good | 32 |
| Example 7 | A1 | 100 | B1 | 30 | 19 | 27 | None | 11 | A1 | Excellent | Good | 32 |
| Example 8 | A1 | 100 | B1 | 30 | 23 | 33 | None | 9 | A1 | Excellent | Good | 29 |
| Example 9 | A2 | 100 | B1 | 10 | 20 | 25 | None | 30 | P2 | Excellent | Good | 32 |
| Example 10 | A2 | 100 | B1 | 10 | 23 | 35 | None | 23 | P2 | Excellent | Good | 30 |
| Example 11 | A2 | 100 | B1 | 10 | 20 | 25 | None | 30 | A2 | Excellent | Good | 40 |
| Example 12 | A2 | 100 | B1 | 10 | 23 | 35 | None | 23 | A2 | Excellent | Good | 25 |
| Example 13 | A2 | 100 | B2 | 30 | 12 | 24 | None | 28 | P4 | Good | Excellent | 29 |
| Example 14 | A2 | 100 | B3 | 30 | 13 | 19 | None | 13 | P4 | Good | Excellent | 30 |
| Example 15 | A2 | 100 | B4 | 30 | 15 | 25 | None | 11 | P4 | Good | Excellent | 36 |
| Example 16 | A2 | 100 | B5 | 30 | 22 | 19 | None | 11 | P4 | Excellent | Excellent | 39 |
| Example 17 | A2 | 100 | B2 | 30 | 25 | 32 | None | 28 | P4 | Good | Excellent | 36 |
| Example 18 | A2 | 100 | B3 | 30 | 20 | 29 | None | 16 | P4 | Good | Excellent | 37 |

-continued

| | Adhesive agent | | Microspheres | | Adhesive layer | | | | | | | Adhesive force (N/25 mm) |
|---|---|---|---|---|---|---|---|---|---|---|---|---|
| | Type | Part by mass | Type | Part by mass | Thickness (μm) | Coated amount (g/m²) | Release liner | 60 Degree gloss | Primer | Blocking resistance A | Slidability A | |
| Example 19 | A2 | 100 | B4 | 30 | 19 | 29 | None | 14 | P4 | Good | Excellent | 30 |
| Example 20 | A2 | 100 | B5 | 30 | 24 | 28 | None | 8 | P4 | Excellent | Excellent | 30 |
| Example 21 | A2 | 100 | B2 | 30 | 12 | 24 | None | 28 | A2 | Good | Good | 42 |
| Example 22 | A2 | 100 | B3 | 30 | 13 | 19 | None | 13 | A2 | Good | Good | 30 |
| Example 23 | A2 | 100 | B4 | 30 | 15 | 25 | None | 11 | A2 | Good | Good | 46 |
| Example 24 | A2 | 100 | B5 | 30 | 22 | 19 | None | 11 | A2 | Excellent | Good | 34 |
| Example 25 | A2 | 100 | B2 | 30 | 25 | 32 | None | 28 | A2 | Good | Good | 34 |
| Example 26 | A2 | 100 | B3 | 30 | 20 | 29 | None | 16 | A2 | Good | Good | 40 |
| Example 27 | A2 | 100 | B4 | 30 | 19 | 25 | None | 14 | A2 | Good | Good | 46 |
| Example 28 | A2 | 100 | B5 | 30 | 24 | 19 | None | 8 | A2 | Excellent | Good | 32 |
| Example 29 | A2 | 100 | B1 | 50 | 23 | 24 | None | 6 | P4 | Excellent | Excellent | 27 |
| Example 30 | A2 | 100 | B1 | 100 | 26 | 27 | None | 4 | P4 | Excellent | Excellent | 22 |
| Example 31 | A2 | 100 | B1 | 50 | 25 | 28 | None | 6 | P4 | Excellent | Excellent | 37 |
| Example 32 | A2 | 100 | B1 | 100 | 30 | 34 | None | 4 | P4 | Excellent | Excellent | 27 |
| Example 33 | A2 | 100 | B1 | 50 | 23 | 24 | None | 6 | A2 | Excellent | Excellent | 32 |
| Example 34 | A2 | 100 | B1 | 100 | 26 | 27 | None | 4 | A2 | Excellent | Excellent | 17 |
| Example 35 | A2 | 100 | B1 | 50 | 25 | 28 | None | 6 | A2 | Excellent | Excellent | 32 |
| Example 36 | A2 | 100 | B1 | 100 | 30 | 34 | None | 4 | A2 | Excellent | Excellent | 16 |
| Example 37 | A2 | 100 | B6 | 30 | 14 | 21 | None | 7 | P4 | Good | Excellent | 12 |
| Example 38 | A2 | 100 | B7 | 30 | 16 | 23 | None | 8 | P4 | Fair | Excellent | 10 |
| Example 39 | A2 | 100 | B8 | 30 | 11 | 19 | None | 7 | P4 | Fair | Excellent | 10 |
| Example 40 | A2 | 100 | B6 | 30 | 19 | 25 | None | 8 | P4 | Good | Excellent | 11 |
| Example 41 | A2 | 100 | B7 | 30 | 20 | 28 | None | 8 | P4 | Fair | Excellent | 10 |
| Example 42 | A2 | 100 | B8 | 30 | 18 | 26 | None | 8 | P4 | Fair | Good | 10 |
| Example 43 | A2 | 100 | B9 | 30 | 35 | 32 | None | 11 | P4 | Excellent | Excellent | 12 |
| Example 44 | A2 | 100 | B6 | 30 | 14 | 21 | None | 7 | A2 | Good | Good | 11 |
| Example 45 | A2 | 100 | B7 | 30 | 16 | 23 | None | 8 | A2 | Fair | Good | 11 |
| Example 46 | A2 | 100 | B9 | 30 | 35 | 32 | None | 11 | A2 | Excellent | Excellent | 13 |
| Example 47 | A1 | 100 | B10 | 30 | 16 | 19 | None | 15 | P5 | Good | Good | 33 |
| Example 48 | A1 | 100 | B10 | 30 | 18 | 21 | None | 14 | P5 | Good | Good | 34 |
| Example 49 | A1 | 100 | B10 | 200 | 11 | 13 | None | 6 | P5 | Good | Good | 17 |
| Example 50 | A1 | 100 | B10 | 400 | 9 | 8 | None | 5 | P5 | Good | Good | 15 |
| Example 51 | A1 | 100 | B1 | 200 | 19 | 16 | None | 3 | P5 | Excellent | Excellent | 7 |

TABLE 3

| | Adhesive agent | | Microspheres | | Adhesive layer | | | | | | | Adhesive force (N/25 mm) |
|---|---|---|---|---|---|---|---|---|---|---|---|---|
| | Type | Part by mass | Type | Part by mass | Thickness (μm) | Coated amount (g/m²) | Release liner | 60 Degree gloss | Primer | Blocking resistance A | Slidability A | |
| Comparative Example 1 | A3 | 100 | None | 0 | 38 | 46 | Yes *) | 47 | P3 | Poor | Poor | 33 |
| Comparative Example 2 | A1 | 100 | None | 0 | 7 | 18 | None | 31 | P1 | Poor | Good | 27 |
| Comparative Example 3 | A1 | 100 | None | 0 | 15 | 26 | None | 34 | P1 | Poor | Good | 32 |
| Comparative Example 4 | A1 | 100 | None | 0 | 7 | 18 | None | 31 | A1 | Good | Poor | 32 |
| Comparative Example 5 | A1 | 100 | None | 0 | 15 | 26 | None | 34 | A1 | Good | Poor | 29 |
| Comparative Example 6 | A3 | 100 | None | 0 | 38 | 46 | Yes | 47 | P3 | Excellent | Poor | 33 |
| Comparative Example 7 | A2 | 100 | B1 | 50 | 23 | 24 | None | 6 | None | Excellent | Excellent | 0 |
| Comparative Example 8 | A2 | 100 | B1 | 100 | 26 | 27 | None | 4 | None | Excellent | Excellent | 0 |
| Comparative Example 9 | A2 | 100 | B2 | 30 | 12 | 24 | None | 28 | None | Good | Excellent | 0 |
| Comparative Example 10 | A2 | 100 | B3 | 30 | 13 | 19 | None | 13 | None | Good | Excellent | 0 |
| Comparative Example 11 | A2 | 100 | B4 | 30 | 15 | 25 | None | 11 | None | Good | Excellent | 0 |
| Comparative Example 12 | A2 | 100 | B5 | 30 | 22 | 19 | None | 11 | None | Excellent | Excellent | 0 |

TABLE 3-continued

|  | Adhesive agent | | Microspheres | | Adhesive layer | | | | | | | Adhesive force |
|---|---|---|---|---|---|---|---|---|---|---|---|---|
|  | Type | Part by mass | Type | Part by mass | Thickness (μm) | Coated amount (g/m²) | Release liner | 60 Degree gloss | Primer | Blocking resistance A | Slidability A | (N/25 mm) |
| Comparative Example 13 | A2 | 100 | None | 0 | 13 | 20 | None | 52 | P4 | Poor | Excellent | 10 |
| Comparative Example 14 | A2 | 100 | None | 0 | 13 | 20 | None | 52 | A2 | Poor | Poor | 10 |

Example 2-1

A contact adhesive composition was prepared by mixing the adhesive agent 1 (A1) and the acrylic microspheres 1 (B1). The mass ratio of A1 and B1 was 100:30 in terms of solid content. The contact adhesive composition was coated on one face of a plywood board (150 mm×70 mm×1 mm thickness) using a brush, and dried at 23° C. for 60 minutes. After the drying, the contact adhesive layer had recesses and protrusions on the surface. The coated amount of the contact adhesive layer was approximately 35 g/m². The evaluation results are shown in Table 4.

Example 2-2

The test piece of Example 2-2 was produced in the same manner as in Example 2-1 except for changing the adhesive agent to the adhesive agent 2 (A2).

Comparative Example 2-1 to 2-3

The test piece of Comparative Example 2-1 to 2-3 were produced in the same manner. However, each condition of the material compositions and evaluation results are shown in Table 4.

TABLE 4

|  | Adhesive agent | | Microspheres | | Blocking resistance B | Slidability B | Adhesive property |
|---|---|---|---|---|---|---|---|
|  | Type | Part by mass | Type | Part by mass | | | |
| Example 2-1 | A1 | 100 | B1 | 30 | Excellent | Good | Good |
| Example 2-2 | A2 | 100 | B1 | 30 | Excellent | Good | Good |
| Comparative Example 2-1 | A1 | 100 | None | 0 | Poor | Poor | Good |
| Comparative Example 2-2 | A2 | 100 | None | 0 | Poor | Poor | Good |
| Comparative Example 2-3 | A4 | 100 | B1 | 30 | Good | Poor | Good |

REFERENCE SIGNS LIST

10 Laminate
12 Substrate layer
14 Contact adhesive layer
16 Contact adhesive agent
18 microsphere
20 Second contact adhesive layer
22 Second contact adhesive agent
24 Second organic resin microsphere
30 Adherend

What is claimed:

1. An adhesive kit comprising:
a laminate configured to be adhered on a second contact adhesive layer covering an installation surface, the laminate comprising:
a substrate layer having a first major surface and a second major surface, and
a contact adhesive layer having a first major surface and a second major surface, the second major surface of the contact adhesive layer adhesively coupled to the first major surface of the substrate layer, the contact adhesive layer comprising a contact adhesive agent and microspheres having an average particle size of 0.5 μm or greater, the contact adhesive agent comprising at least one of chloroprene rubber or acrylic copolymers, the contact adhesive layer comprising from 5 parts by mass to 500 parts by mass of the microspheres per 100 parts by mass of the contact adhesive agent, the first major surface of the contact adhesive layer comprising a plurality of protrusions corresponding to the locations of at least some of the microspheres; and
a primer agent comprising a second contact adhesive agent comprising at least one of chloroprene rubber or acrylic copolymers, and the primer agent comprising second microspheres having an average particle size of 0.5 μm or greater, the second microspheres comprising a crosslinked resin and are nontacky, solid microspheres of acrylic polymer or urethane polymer.

2. The adhesive kit of claim 1, wherein the contact adhesive layer is nontacky.

3. The adhesive kit of claim 1, wherein the microspheres are nontacky.

4. The adhesive kit of claim 1, wherein the microspheres are solid microspheres of acrylic polymer.

5. The adhesive kit of claim 1, wherein the second microspheres are solid microspheres of acrylic polymer.

6. The adhesive kit of claim 1, wherein a mass per unit area of the contact adhesive layer is from 5 g/m² to 100 g/m².

7. The adhesive kit of claim 1, wherein a 60 degree gloss value of the first major surface of the contact adhesive layer is from 1 to 40.

8. The adhesive kit of claim 1, wherein the contact adhesive agent comprises acrylic copolymer having a glass transition temperature from 0° C. to 60° C.

9. The adhesive kit of claim 1, wherein the primer agent comprises from 5 parts by mass to 500 parts by mass of the second microspheres per 100 parts by mass of the second contact adhesive agent.

10. A laminated structure formed on an installation surface to be adhered wherein the laminated structure is formed using the adhesive kit of claim 1 and wherein the laminated structure comprises:

the laminate, and a second contact adhesive layer formed by the primer agent covered on the installation surface, wherein both of the contact adhesive layer of the laminate and the second contact adhesive layer are adhered each other.

11. The laminated structure of claim 10, wherein the second contact adhesive layer comprises a plurality of protrusions corresponding to locations of at least some of the second microspheres.

12. The laminated structure of claim 10, wherein the second contact adhesive layer comprises from 5 parts by mass to 500 parts by mass of the second microspheres per 100 parts by mass of the second contact adhesive agent.

13. The laminated structure of claim 10, wherein the microspheres are solid microspheres of acrylic polymer.

14. The laminated structure of claim 10, wherein the second microspheres are solid microspheres of acrylic polymer.

* * * * *